US005237124A

United States Patent [19]

Tabei

[11] Patent Number: 5,237,124

[45] Date of Patent: Aug. 17, 1993

[54] TRANSMISSION SOUND DEVELOPING SYSTEM WITH PCM DATA

[75] Inventor: Kazuhiko Tabei, Tokyo, Japan

[73] Assignee: NEC Corporation, Tokyo, Japan

[21] Appl. No.: 718,796

[22] Filed: Jun. 21, 1991

[30] Foreign Application Priority Data

Jun. 22, 1990 [JP] Japan .................................. 2-164535

[51] Int. Cl.[5] ......................... G09B 15/04; G10H 7/02

[52] U.S. Cl. ..................................... 84/603; 84/477 R

[58] Field of Search ...................... 84/603, 477 R, 478, 84/DIG. 6

[56] References Cited

U.S. PATENT DOCUMENTS 4,535,356 8/1985 Nakagawa et al. ............ 84/DIG. 6

*Primary Examiner*—Stanley J. Witkowski

[57] ABSTRACT

A waveform of a desired sound is displayed on a CRT, and is observed for the analysis of the waveform. Waveform information including a shape, a repetition number, an amplitude, and a frequency of a segmental waveform which is a part of the displayed waveform is supplied to a repetitive PCM data generating unit, by which the repetitive PCM data are generated. The repetitive PCM data are developed to be a PCM sound signal which is converted to an analog output sound signal. A sound generated by the analog output sound signal is appreciated.

5 Claims, 5 Drawing Sheets

ENVELOPE OF SOUND SIGNAL

APPROXIMATE ENVELOPE BY REPETITIVE PCM METHOD

TRANSMISSION SOUND DEVELOPING SYSTEM WITH PCM DATA

FIELD OF THE INVENTION

This invention relates to a system for developing sounds, and more particularly to, an improvement in a system for developing sounds such as melody, sound effects, etc.

BACKGROUND OF THE INVENTION

Sounds such as melody, sound effects, etc. are generally defined by a signal having regular waveforms such as sinusoidal waveform, triangle waveform, rectangle waveform, etc. Sounds are conventionally converted from analog signals to digital signals of PCM data to be stored in a melody IC, wherein a repetitive PCM method is utilized to decrease an amount of the stored data.

The repetitive PCM method is a method, in which PCM data of segmental waveforms and repetition numbers of the segmental waveforms are stored, when the same or similar waveforms continue repetitively in sections of a sound signal each including plural periods.

Conventionally, a personal computer is used for a system for developing sounds. Practically, sound signal waveform information such as shapes of segmental waveforms, repetition numbers of the segmental waveforms, amplitudes of the segmental waveforms, and frequencies of the segmental waveforms is supplied to the personal computer, in which the information is edited, so that a waveforms of the sound signal are obtained to be displayed on a CRT of the personal computer. A desired waveform of a sound signal thus obtained is supplied to be stored in a melody IC, etc.

However, the conventional system for developing sounds has a disadvantage in that information supplied to the personal computer is difficult for an operator to be analyzed, so that it takes a long time in developing a desired sound. Even if a spectrum analyzer is used to analyze a waveform of a predetermined sound signal, the disadvantage is not overcome, because the spectrum analyzer only provides limited information. Otherwise, when information is supplied to the personal computer in try and error method without using the spectrum analyzer, the above described difficulty will be increased.

SUMMARY OF THE INVENTION

Accordingly, it is an object of the invention to provide a system for developing sounds, in which the waveform analysis of a predetermined sound is easy to be carried out.

It is a further object of the invention to provide a system for developing sounds, in which a developing time of a predetermined sound is shortened.

According to the invention, a system for developing sounds, comprises:

means for displaying a waveform of a sound signal;

means for generating repetitive PCM data by receiving waveform information obtained from visual analysis of the waveform displayed on the displaying means, the waveform information including a shape, a repetition number, an amplitude, and a frequency of a segmental waveform which is a part of the displayed waveform; and means for generating a sound by receiving the repetitive PCM data.

BRIEF DESCRIPTION OF THE DRAWINGS

The invention will be explained in more detail in conjunction with appended drawings, wherein.

DESCRIPTION OF THE PREFERRED EMBODIMENTS

Figure 1:
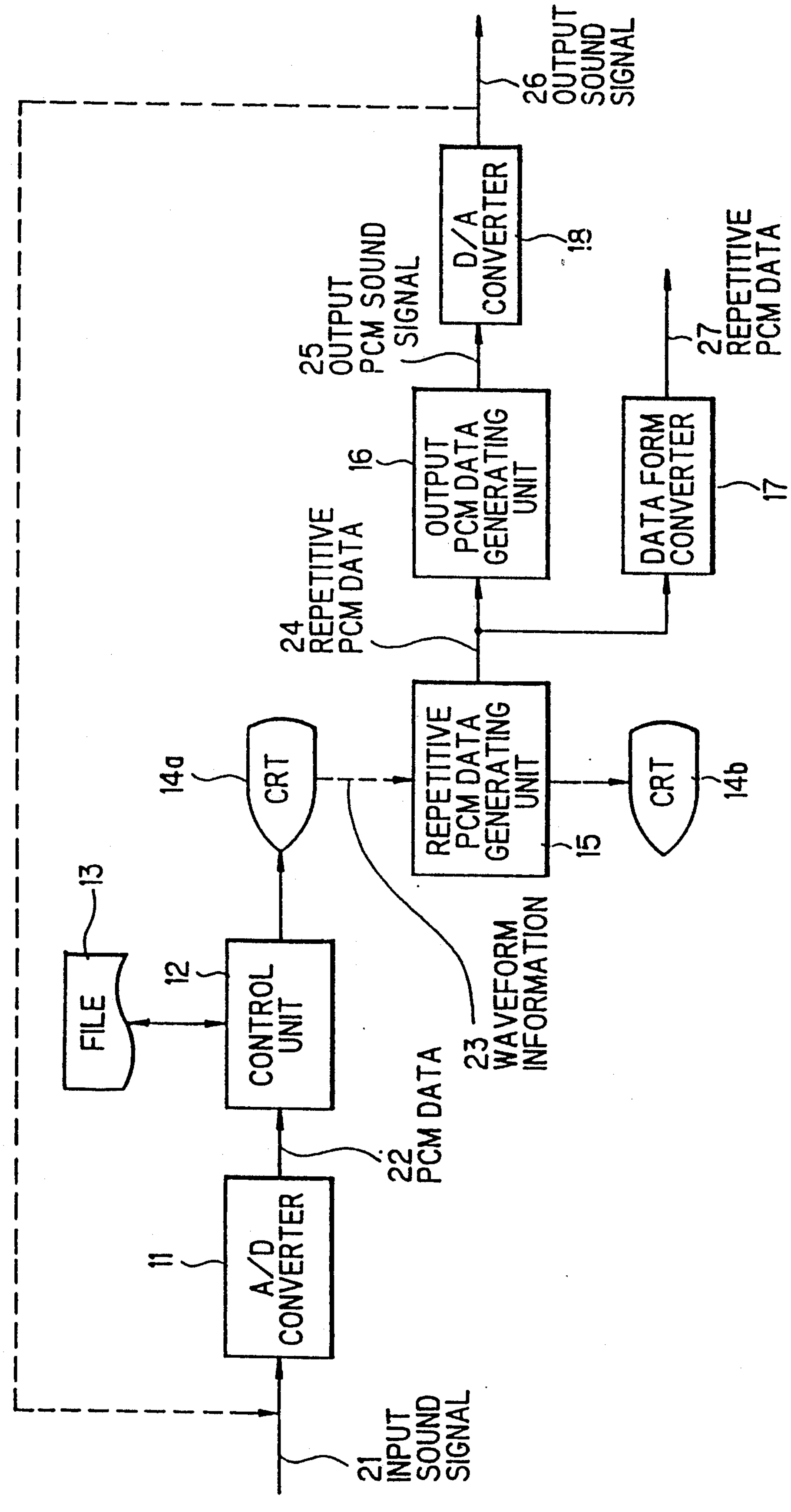
FIG. 1 is a block diagram showing a system for developing sounds in a preferred embodiment according to the invention.

FIG. 1 shows a system for developing sounds in the preferred embodiment according to the invention. The sound developing system comprises an analog to digital converter 11 operating as an encoder for generating PCM data 22 by converting an analog input sound signal 21 which is an original predetermined sound to a digital sound signal, and a control unit 12 for controlling a file 13 to store the PCM data 22 and a CRT 14*a* to display the PCM data read from the file 13. The sound developing system further comprises a repetitive PCM data generating unit 15 for generating repetitive PCM data 24 by receiving waveform information 23 supplied through a man to machine interface (not shown) such as a ten key board, a mouse, etc. from an operator who observes to analyze a signal waveform displayed on the CRT 14*a*, a CRT 14*b* for displaying a sound signal defined by the repetitive PCM data 24 which are generated in the generating unit 15, an output PCM data generating unit 16 for generating an output PCM sound signal 25 by developing the repetitive PCM data 24, a digital to analog converter 18 for generating an analog output sound signal 26 by the D/A conversion of the output PCM sound signal 25, and a data-form converter 17 for converting the repetitive PCM data 24 in data-formation to supply a melody IC with the request repetitive PCM data 27 to be stored therein.

Figure 2A:
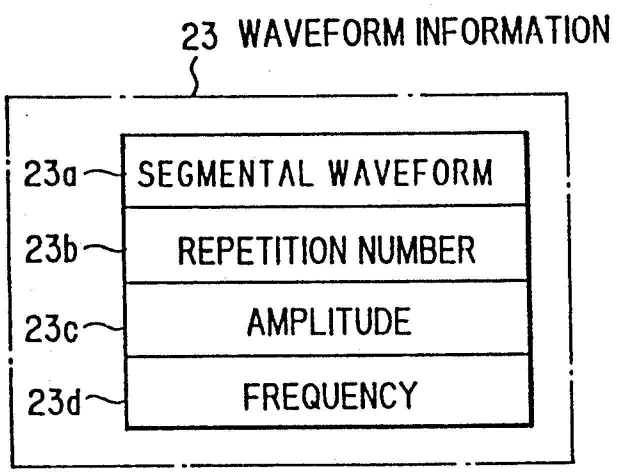
FIGS. 2A and 2B are explanatory diagrams showing data used in the preferred embodiment.

FIG. 2A shows the waveform information 23 which is supplied through the man to machine interface to the repetitive PCM data generating unit 15 by the operator. The waveform information 23 includes data relating to shapes of segmental waveforms 23*a*, repetition numbers of the segmental waveforms 23*b*, amplitudes of the segmental waveforms 23*c*, and frequencies of the segmental waveforms 23*d*.

Figure 2B:
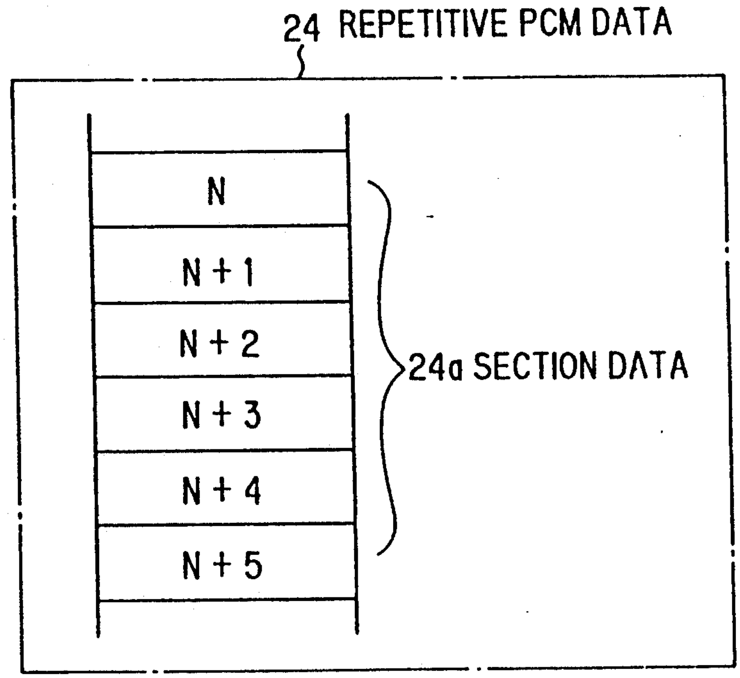

FIG. 2B shows section repetitive PCM data N, N+1, N+2, . . . which are developed to compose the output PCM sound signal 25 in the output PCM data generating unit 16. Each section data defines a section waveform of a predetermined sound determined by waveform information as explained in FIG. 2A.

Here, the aforementioned repetitive PCM method will be explained in FIGS. 3A and 3B.

Figure 3A:
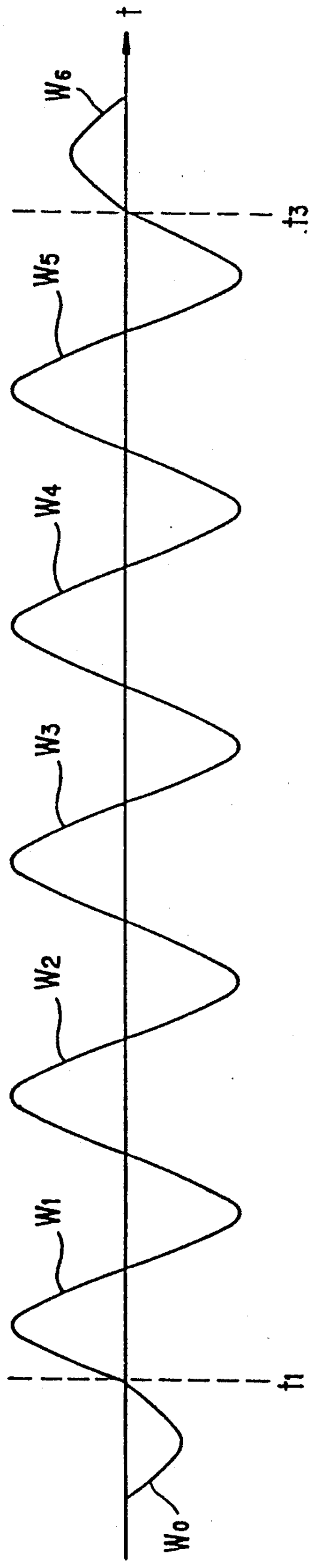
FIGS. 3A and 3B are waveform diagrams for explaining principle of a repetitive PCM method.
Figure 3B:
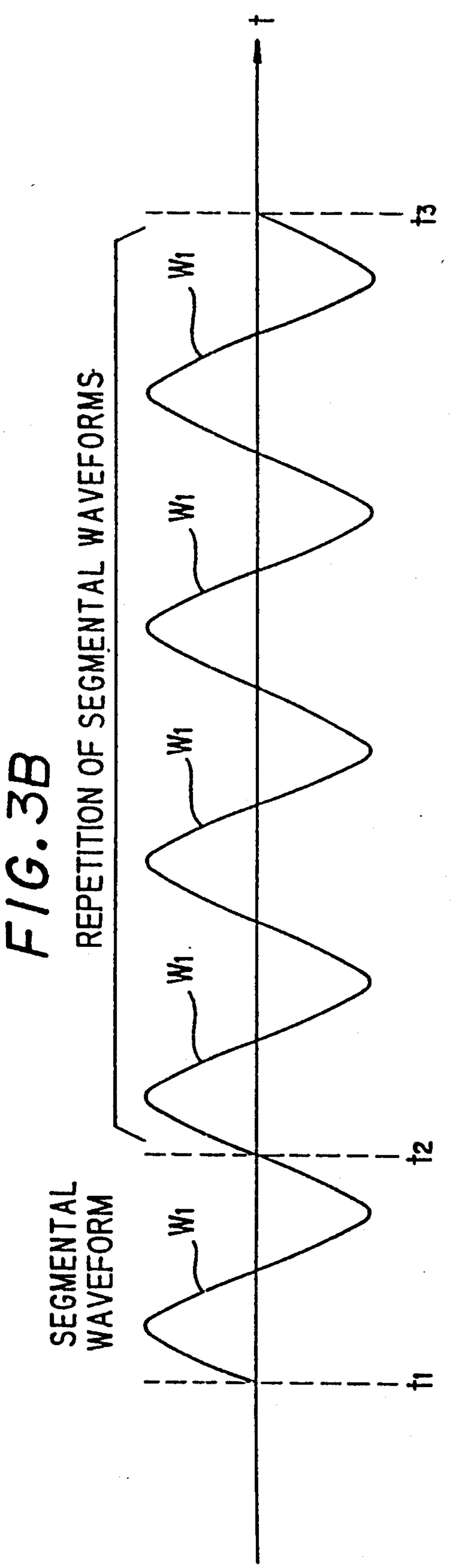

In FIG. 3A, an original sound signal having the same or similar waveform shapes $W_1$, $W_2$, $W_3$, $W_4$ and $W_5$ are shown during five periods for times $t_1$ to $t_3$ Prior to the time $t_1$ and subsequent to the time $t_3$, shapes $W_0$ and $W_6$ of waveform are different from the shapes $W_1$ to $W_5$. In this case, the shape $W_1$ which will be "a segmental waveform" is stored in a memory of the repetitive PCM data generating unit 15 in the form of PCM data along with a repetition number of the segmental waveform which is "5". In this preferred embodiment, the shape $W_1$ is further defined by an amplitude and a frequency. When the repetitive PCM data 24 including the shape $W_1$, the repetitive number "5", the amplitude, and the frequency are supplied from the repetitive PCM data generating unit 15 to the output PCM data generating unit 16 along with waveform information of other sections, an output PCM sound signal 25 having the five consecutive shapes $W_1$ is generated in the output PCM data generating unit 16 for the times $t_1$ to $t_3$ as shown in FIG. 3B.

In this repetitive PCM method, an output PCM sound signal is defined by below equations (1) and (2).

$$S_k = W_k \times N_k \qquad (1)$$

$$S_{out} = \sum_{k=1}^{n} S_k = S_1 + S_2 \ldots + S_n \qquad (2)$$

where $W_k$ is a segmental waveform of the k th, $N_k$ is a repetition number of the segmental waveform $W_k$, $S_k$ is a section waveform of the k th, and $S_{out}$ is an output PCM sound signal.

Figure 4A:
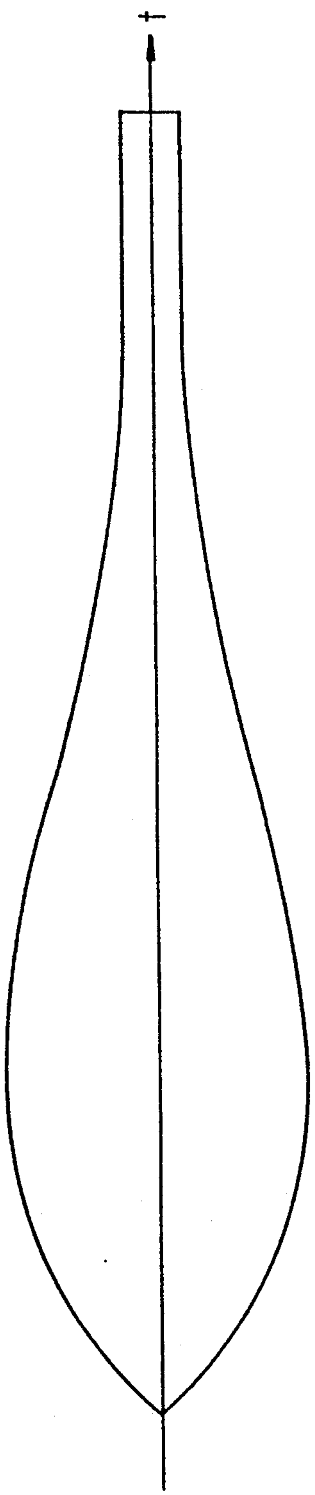
FIGS 4A and 4B are waveform diagrams showing a sound signal displayed on CRTs of a personal computer in the preferred embodiment.
Figure 4B:
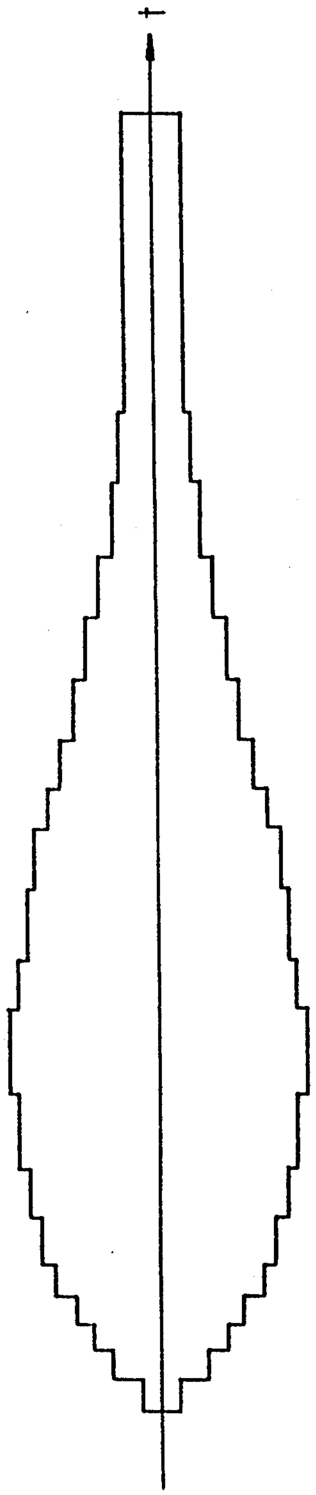

In this repetitive PCM method, an envelope of a sound signal such as melody, sound effects, etc. as shown in FIG. 4A is converted to a sound signal waveform having steps each indicating one section ($S_k = W_k \times N_k$) as shown in FIG. 4B.

Figure 5:
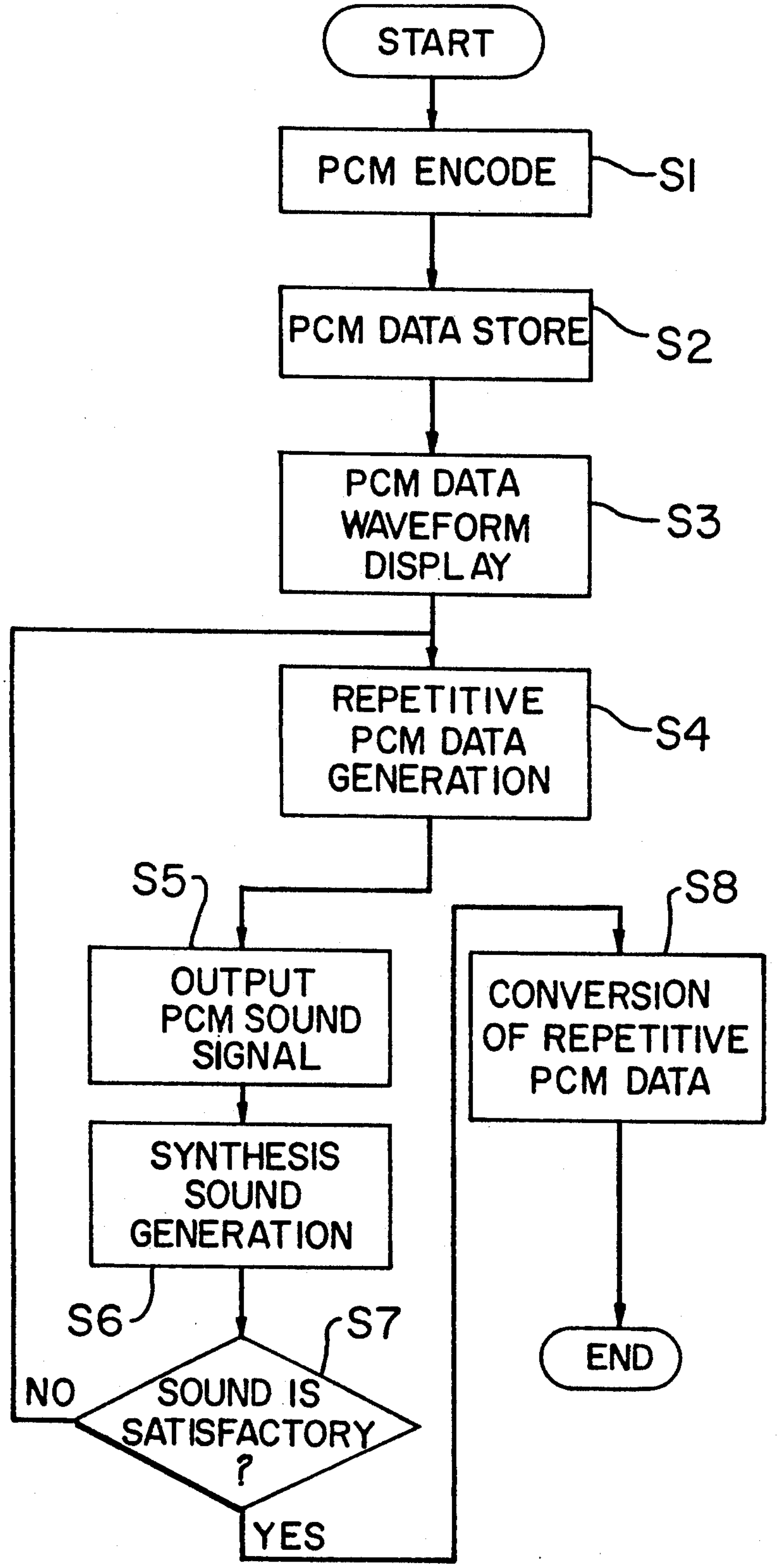
FIG. 5 is a flow chart for explaining operation in the preferred embodiment.

Operation will be explained in conjunction with FIG. 5.

A predetermined desired sound such as melody, sound effects, etc. is produced by means of musical instruments, etc., so that an analog input sound signal 21 is supplied to the analog to digital converter 11, in which PCM sound data 22 are generated in accordance with PCM encoding of the input sound signal 21 (step S1). The PCM data 22 are stored in the file 13 by the control unit 12 (step S2), and the PCM data read from the file 13 are displayed on the CRT 14a by the control unit 12 (step S3). The displayed signal is shown, for instance, in FIG. 4A. The displayed signal is observed to be analyzed by an operator. The visual observation provides the waveform information 23 as shown in FIG. 2A. The waveform information 23 including the shape of the segmental waveform 23a, the repetition number of the segmental waveform 23b, the amplitude of the segmental waveform 23c, and the frequency of the segmental waveform 23d is supplied to the repetitive PCM data generating unit 15 by use of the man to machine interface by the operator. In the repetitive PCM data generating unit 15, the repetitive PCM data of plural sections as shown in FIG. 2B are generated (step S4) in the manner set forth below.

At first, a waveform (for instance, that in FIG. 4A) displayed on the CRT 14a is observed visually by the operator, so that the waveform information 23 is supplied to the repetitive PCM data generating unit 15 manually by the operator. As a result, a waveform (for instance, that in FIG. 4B) are displayed on the CRT 14b in accordance with the input waveform information 23. The waveform displayed on the CRT 14b is also observed visually by the operator, and is corrected to be proximate to the waveform displayed on the CRT 14a as much as possible by correcting the waveform information 23 supplied to the repetitive PCM data generating unit 15. Thus, the repetitive PCM data 24 of plural sections as shown in FIG. 2B are generated to include section data 24a each including respective waveform information 23 as shown in FIG. 2A, and then developed in the output PCM data generating unit 16 to provide the output PCM sound signal 25 (step S5). The output PCM sound signal 25 which is a digital signal is converted in the digital to analog converter 18 to the output sound signal 26 of an analog signal to provide a synthesis sound of the repetitive PCM method (step S6). The output sound signal 26 is supplied to a speak, etc., so that a sound is appreciated as to whether or not the sound is satisfactory by a listener (step S7). If not satisfactory, waveform information is further supplied to the repetitive PCM data generating unit 15, so that the output sound signal 26 is corrected to comply with the request of the listener. On the other hand, the repetitive PCM data 24 are supplied to the data-form converter 17 and converted therein to a sound signal of a predetermined data formation which is thereby to be stored into a ROM such as a melody IC, etc. (step S8). The output sound signal 26 may be fed back to the analog to digital converter 11.

In the preferred embodiment, the section repetitive PCM data 24a (N, N+1, N+2, . . . ) may include the same or different waveform information. In addition, the CRTs 14a and 14b may be of a single CRT which is divided into at least two displaying sections, or which displays at least two sound signal waveforms by time-division method. If a personal computer is used to realize a system for developing sounds according to the invention, only the analog to digital and digital to analog converters 11 and 18, and the CRTs 14a and 14b may be hardware, so that the remaining units can be realized by software.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. A system for developing sounds, comprising:
   - displaying means for displaying a waveform of a sound signal;
   - first generating means for receiving from said displaying means waveform information obtained from visual analysis of said waveform displayed on said displaying means, said waveform information including a shape, a repetition number, an amplitude, and a frequency of a segmental waveform which is a pair of the waveform displayed on said displaying means, said first generating means generating repetitive PCM data in response to said waveform information; and
   - second generating means for receiving said repetitive PCM data from said first generating means and generating a sound in response to said repetitive PCM data.

2. A system for developing sounds, according to claim 1, further comprising:
   - means for converting said repetitive PCM data to repetitive PCM data having a predetermined data formation thereby to be stored into an IC ROM.

3. A system for developing sounds, according to claim 1, further comprising:

means for converting said sound signal to a PCM sound signal;

means for storing said PCM sound signal; and means for controlling said storing means and said displaying means to display a waveform of said PCM sound signal read from said storing means on said displaying means.

4. A system for developing sounds, according to claim 1, wherein:

said first generating means includes means for displaying a waveform of said repetitive PCM data.

5. A system for developing sounds, comprising:

means for displaying a waveform of a sound signal;

means for receiving from said displaying means waveform information obtained from visual analysis of said waveform, and a frequency of a segmental waveform which is a part of the waveform displayed on said displaying means, and generating repetitive PCM data in response to said waveform information;

means for receiving said repetitive PCM data from said generating means and generating a sound in response to said repetitive PCM data; and means connected to said generating means for displaying a waveform of said repetitive PCM data.

* * * * *